United States Patent
Atwood et al.

(10) Patent No.: US 12,481,951 B2
(45) Date of Patent: *Nov. 25, 2025

(54) SYSTEMS AND METHODS FOR IMPUTATION OF SHIPMENT MILESTONES

(71) Applicant: P44, LLC, Chicago, IL (US)

(72) Inventors: Thomas Janos Atwood, Venice, CA (US); Milad Davaloo, Oakland, CA (US); Marc-Henri Paul Gires, New York, NY (US)

(73) Assignee: P44, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,995

(22) Filed: May 28, 2024

(65) Prior Publication Data

US 2024/0311748 A1 Sep. 19, 2024

Related U.S. Application Data

(63) Continuation of application No. 17/967,780, filed on Oct. 17, 2022, now Pat. No. 12,001,996, which is a
(Continued)

(51) Int. Cl.
*G06Q 10/0833* (2023.01)
*G06Q 10/083* (2023.01)
(Continued)

(52) U.S. Cl.
CPC ..... *G06Q 10/0833* (2013.01); *G06Q 10/0838* (2013.01); *H04W 4/021* (2013.01); *H04W 4/029* (2018.02)

(58) Field of Classification Search
CPC . G06Q 10/08; G06Q 10/0833; G06Q 10/0838
See application file for complete search history.

(56) References Cited

U.S. PATENT DOCUMENTS 6,420,999 B1 7/2002 Vayanos
7,974,642 B2 7/2011 Lin et al.
(Continued)

FOREIGN PATENT DOCUMENTS

CN 106162544 A 11/2016
WO WO-2018/146518 A1 8/2018

OTHER PUBLICATIONS

Gingerich, Kevin, Hanna Maoh, and William Anderson. "Classifying the purpose of stopped truck events: An application of entropy to GPS data." Transportation Research Part C: Emerging Technologies 64 (2016): 17-27. (Year: 2016).*
(Continued)

*Primary Examiner* — Scott M Tungate
(74) *Attorney, Agent, or Firm* — MARSHALL, GERSTEIN & BORUN LLP

(57) ABSTRACT

The present disclosure provides systems and methods that impute missing shipment milestones using vehicle tracking data (e.g., global positioning system (GPS data, automatic identification system (AIS) data, and/or the like). In particular, the present disclosure provides improved techniques to impute when a shipping vehicle (and the cargo loaded thereon) has arrived at a transportation location (e.g., port). In some implementations, the milestone imputation process first includes collecting a historical sample of the vehicle tracking data. Next, density-based clustering methods can be applied to identify vessel stops. This historical set of vessel stops can then be further clustered in order to identify individual docking or loading/unloading locations for all the transportation locations around the world. Once these docking locations have been identified, a geofence can be established around those locations and used to determine when a shipping vehicle has arrived at the corresponding transportation location and/or docking location.

17 Claims, 8 Drawing Sheets

Related U.S. Application Data continuation of application No. 16/571,890, filed on Sep. 16, 2019, now Pat. No. 11,501,245.

(51) Int. Cl.
  *H04W 4/021* (2018.01)
  *H04W 4/029* (2018.01)

(56) References Cited

U.S. PATENT DOCUMENTS

| | | | |
|---|---|---|---|
| 8,756,010 B2 | 6/2014 | Gupta et al. | |
| 8,903,414 B2 | 12/2014 | Marti et al. | |
| 9,571,968 B1 | 2/2017 | Barron et al. | |
| 9,788,156 B1 | 10/2017 | Anderson et al. | |
| 9,848,301 B2 | 12/2017 | Mappus et al. | |
| 9,998,876 B2 | 6/2018 | Mappus et al. | |
| 10,198,707 B1 * | 2/2019 | Bolton | G06Q 10/08355 |
| 2010/0169005 A1 | 7/2010 | Guillet et al. | |
| 2011/0133888 A1 * | 6/2011 | Stevens | G06Q 10/0833 |
| | | | 340/8.1 |
| 2011/0302116 A1 * | 12/2011 | Ide | G08G 1/096844 |
| | | | 706/12 |
| 2011/0312344 A1 | 12/2011 | McCahill et al. | |
| 2012/0309409 A1 | 12/2012 | Grosman et al. | |
| 2013/0031047 A1 | 1/2013 | Boazi et al. | |
| 2014/0229501 A1 | 8/2014 | Josefiak | |
| 2014/0258201 A1 | 9/2014 | Finlow-Bates | |
| 2017/0103259 A1 | 4/2017 | Anastassov et al. | |
| 2018/0204030 A1 * | 7/2018 | Bruce | G06K 19/07758 |

OTHER PUBLICATIONS

Gong, L., Sato, H., Yamamoto, T et al. Identification of activity stop locations in GPS trajectories by density-based clustering method combined with support vector machines. J. Mod. Transport. 23, 202-213 (2015). https://doi.org/10.1007/s40534-015-0079-x. (Year: 2015).*

Dobrkovic et al.. "Using machine learning for unsupervised maritime waypoint discovery from streaming AIS data." Proceedings of the 15th International Conference on Knowledge Technologies and Data-driven Business. 2015.

* cited by examiner

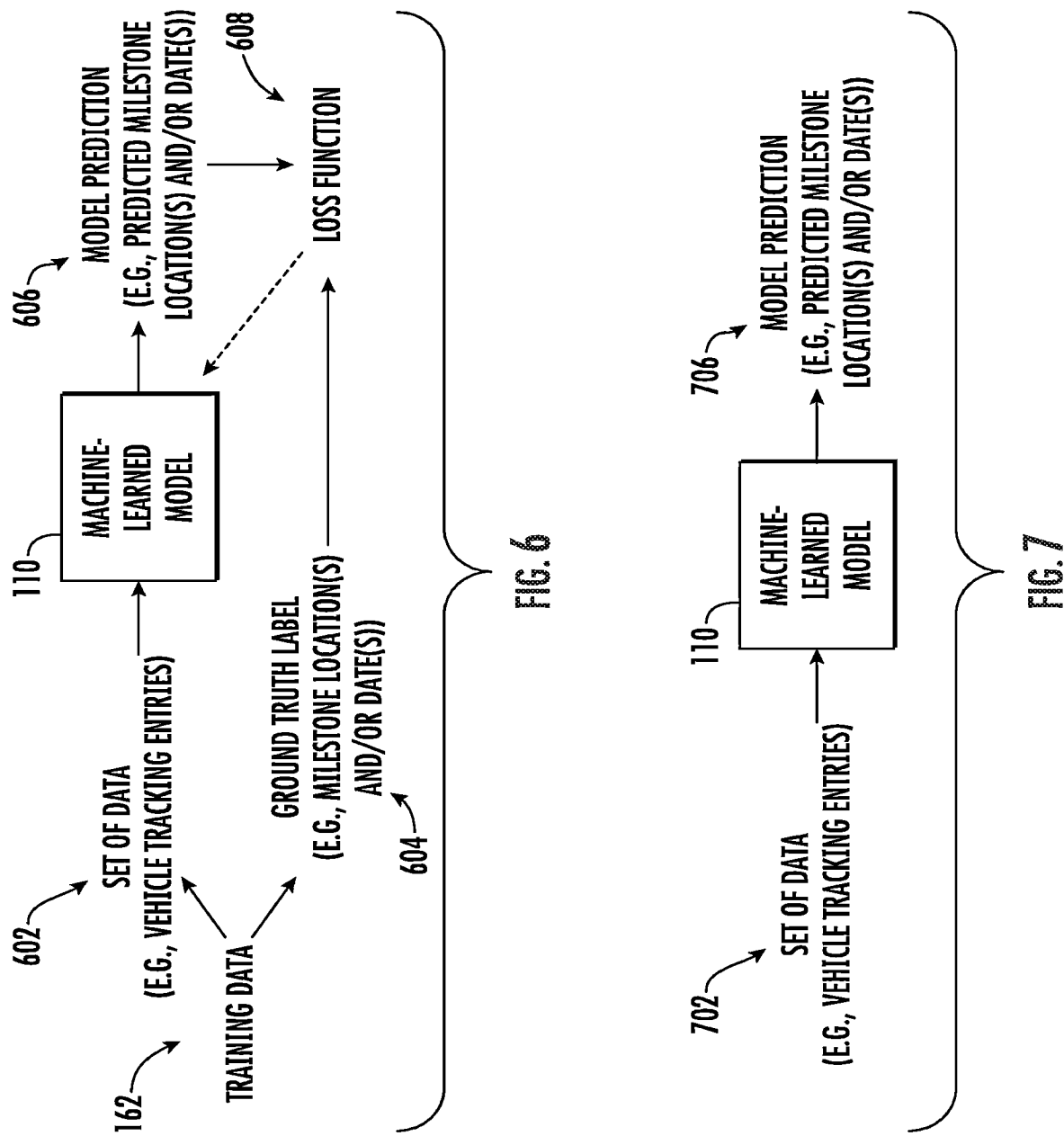

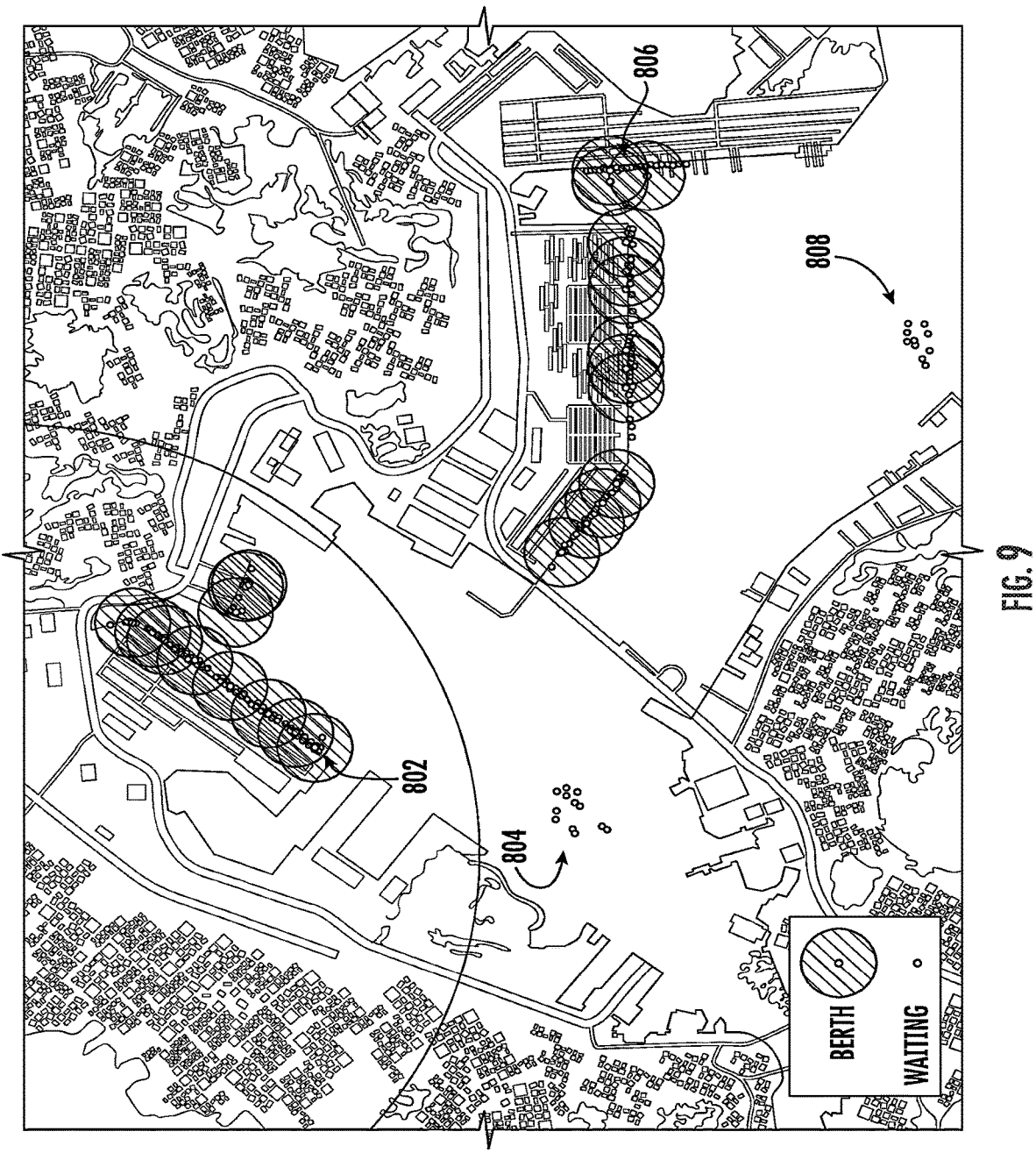

SYSTEMS AND METHODS FOR IMPUTATION OF SHIPMENT MILESTONES

CROSS-REFERENCE TO RELATED APPLICATIONS

This application is a continuation application of U.S. patent application Ser. No. 17/967,780, filed Nov. 17, 2022, which is a continuation of U.S. patent application Ser. No. 16/571,890 (now U.S. Pat. No. 11,501,245), filed Sep. 16, 2019. These applications are hereby incorporated by reference in their entireties.

TECHNICAL FIELD

The present disclosure relates generally to management of shipments, for example, as an aspect of supply chain management. More particularly, the present disclosure relates to systems and methods for imputation of shipment milestones based, for example, on vehicle tracking data associating with shipping vehicles.

BACKGROUND

A supply chain can refer to or include a system of organizations, people, activities, information, and/or resources involved in moving materials, products, or other items from a supplier to a customer and/or one or more intermediaries between the supplier and the customer and/or among different sites operated by an organization. Organizations often seek to perform supply chain management and optimization by applying processes and tools to ensure the optimal operation of a manufacturing and distribution supply chain. This can include the optimal placement of inventory within the supply chain, minimizing operating costs (including manufacturing costs, transportation costs, and/or distribution costs), and/or other operational considerations. Supply chain management and optimization can be a critical component in bringing products to market at competitive price points.

Over the past decades, increases in global trade and manufacturing have resulted in an increase in the number of supply chains which require or include shipment of materials, products, or other items from one place to another. These shipments can include, for example, long distance shipments via shipping vehicles such as container ships, railcars, long-haul trucks, freight aircraft, and/or the like. Thus, a critical aspect of managing and optimizing a supply chain is monitoring, evaluating, or otherwise optimizing the shipment of materials, products, or other items from one location to another.

To achieve shipments as described above, a shipper (i.e., the entity seeking to acquire shipment services) can contract or otherwise interact with a carrier (i.e., the entity seeking to supply shipment services) to acquire shipment services to ship one or more items of cargo from a first location to a second, different location. In some instances, a shipper may include or be referred to as a beneficial cargo owner (BCO). In some instances, various additional parties (e.g., additional beyond those that are explicitly party to the shipment agreement) may have an interest or role in shipment of the cargo. As one example, a shipper may contract or otherwise interact with a third party lader or a freight forwarder, rather than directly with the carrier. As another example, a first carrier may subcontract with a second carrier to complete some portion of the shipment. As used herein, the terms "shipper" and "carrier" should be construed broadly to encompass all of the various parties which have an interest or role in shipment of the cargo.

The carrier can supply the shipper with an itinerary that identifies various attributes or characteristics of the planned shipment. The carrier can send the itinerary at the time the shipment agreement is entered into and/or periodically before and/or during completion of the shipment (e.g., as part of a "status update"). As an example, an itinerary can provide information regarding a route the shipment may take (e.g., by specifying the origin and/or destination of one or more shipping legs); identification of one or more shipping vehicles that will perform the shipment (e.g., the specific identification names, numbers, or codes (collectively referred to as "vehicle IDs") of one or more shipping vehicles that will carry the cargo), planned shipment dates (e.g., estimated dates of departure and/or arrival for the one or more shipping legs); identification of one or more particular containers in which the cargo will be shipped, stored, or otherwise housed (container IDs); and/or other information. As one example, an itinerary can take the form of an Electronic Data Interchange (EDI) message that provides scheduling and itinerary information related to a shipping vehicle such as an ocean vessel.

In some instances, the itinerary data can include or be supplemented with event data that is sent from the carrier to the shipper when various events or other milestones associated with the shipment occur or are achieved during performance of the shipment. As one example, an event or milestone may occur or be achieved when the shipping vehicle (and therefore the item(s) of cargo carried thereby) arrives at or enters a certain transportation location (e.g., ports, railyards, distribution centers, trucking depots, etc.). As another example, an event or milestone may occur or be achieved when the shipping vehicle (and therefore the item(s) of cargo carried thereby) departs from a certain transportation location. Often, this event data is sent from the carrier to the shipper in the form of an EDI message.

However, many carriers provide incomplete and/or inaccurate itinerary data and/or event or milestone data for shipments. In particular, many carriers fail to provide timely event data when various events or other milestones associated with the shipment occur or are achieved during performance of the shipment. Thus, although a certain shipping vehicle may have arrived at a certain transportation location (e.g., port), the carrier may fail to provide the event data at all or may provide the event data only substantially after the event has occurred. As such, shippers may not have a complete and accurate understanding of when certain events or milestones occur or are achieved.

This incomplete and/or inaccurate provisioning of event data can result in suboptimal performance of the corresponding supply chain. In particular, as described above, supply chains often include the management and optimization of many interrelated processes, resources, and/or shipments. Incomplete and/or incorrect information can reduce the efficiency of such interrelated items, for example, by causing certain planned operations to be unknowingly delayed, which can result in increased manufacturing costs, transportation costs, and/or distribution costs. Furthermore, while incomplete information can be problematic due to increased uncertainty, incorrect information can be even more damaging, as it will often cause other planned processes to be incorrectly scheduled or otherwise planned with explicit error.

Improved understanding of such missing or incorrect event data for shipment events or milestones would have large benefits in improving certainty and correctness of supply chain management and planning.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for imputation of shipment milestones associated with shipments of cargo. The method includes obtaining, by a computing system comprising one or more computing devices, historical vehicle tracking data that describes historical locations of one or more shipping vehicles. The method includes performing, by the computing system, a first clustering technique on the historical vehicle tracking data to identify a plurality of first clusters, wherein the plurality of first clusters are indicative of a plurality of stop locations at which shipping vehicles have historically stopped. The method includes performing, by the computing system, a second clustering technique on the plurality of first clusters to identify a plurality of second clusters, wherein the plurality of second clusters are indicative of a plurality of transportation locations at which the one or more shipping vehicles are subject to loading or unloading of cargo. The method includes defining, by the computing system, one or more geofences for each of the plurality of transportation locations based at least in part on the plurality of second clusters.

Another example aspect of the present disclosure is directed to a supply chain management computing system that includes one or more processors and one or more non-transitory computer-readable media that collectively store instructions that, when executed by the one or more processors, cause the supply chain management computing system to perform operations. The operations include obtaining historical vehicle tracking data that comprises a plurality of historical vehicle tracking entries, wherein each historical vehicle tracking entry describes a historical location of one of the shipping vehicles at a particular time and a speed at which the one of the shipping vehicles was travelling at the particular time. The operations include applying a low pass speed filter that filters the vehicle tracking entries based on speed to produce vehicle stop data that comprises only the historical vehicle tracking entries that describe speeds below a threshold speed. The operations include identifying one or more primary clusters based at least in part on the vehicle stop data. The operations include defining one or more geofences based at least in part on the one or more primary clusters.

Another example aspect of the present disclosure is directed to one or more non-transitory computer-readable media that collectively store instructions that, when executed by one or more processors of a computing system, cause the computing system to perform operations. The operations include obtaining, by the computing system, historical vehicle tracking data that describes historical locations of one or more shipping vehicles, wherein the one or more shipping vehicle comprise one or more container ships, and wherein the historical vehicle tracking data comprises historical automatic identification system (AIS) data. The operations include performing, by the computing system, one or more clustering techniques on the historical vehicle tracking data to identify a plurality of clusters, wherein the plurality of clusters are indicative of a plurality of transportation locations at which the one or more shipping vehicles are subject to loading or unloading of cargo, wherein the plurality of transportation locations comprise a plurality of ports, a plurality of port terminals, or a plurality of vessel berths. The operations include defining, by the computing system, one or more geofences for each of the plurality of transportation locations based at least in part on the plurality of clusters. The operations include obtaining, by the computing system, new vehicle tracking data from a particular shipping vehicle, wherein the new vehicle tracking data indicates a current location of the particular shipping vehicle. The operations include comparing, by the computing system, the current location of the particular shipping vehicle to at least one geofence of the one or more geofences defined for the plurality of transportation locations to determine whether the particular shipping vehicle is present at the respective transportation location associated with the at least one geofence. The operations include in response to a determination that the particular shipping vehicle is present at the respective transportation location associated with the at least one geofence, inserting a data entry into a data record associated with the particular shipping vehicle, the data entry indicating that the particular shipping vehicle is present at the respective transportation location associated with the at least one geofence.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles

BRIEF DESCRIPTION OF THE DRAWINGS

Detailed discussion of embodiments directed to one of ordinary skill in the art is set forth in the specification, which makes reference to the appended figures, in which:

FIG. 6 depicts an example processing work flow for training a machine-learned model according to example embodiments of the present disclosure.

FIG. 7 depicts an example processing workflow for employing a machine-learned model according to example embodiments of the present disclosure.

FIG. 9 depicts an example set of clusters determined for the vehicle tracking data of FIG. 8 according to example embodiments of the present disclosure

DETAILED DESCRIPTION

Overview

Figure 1:
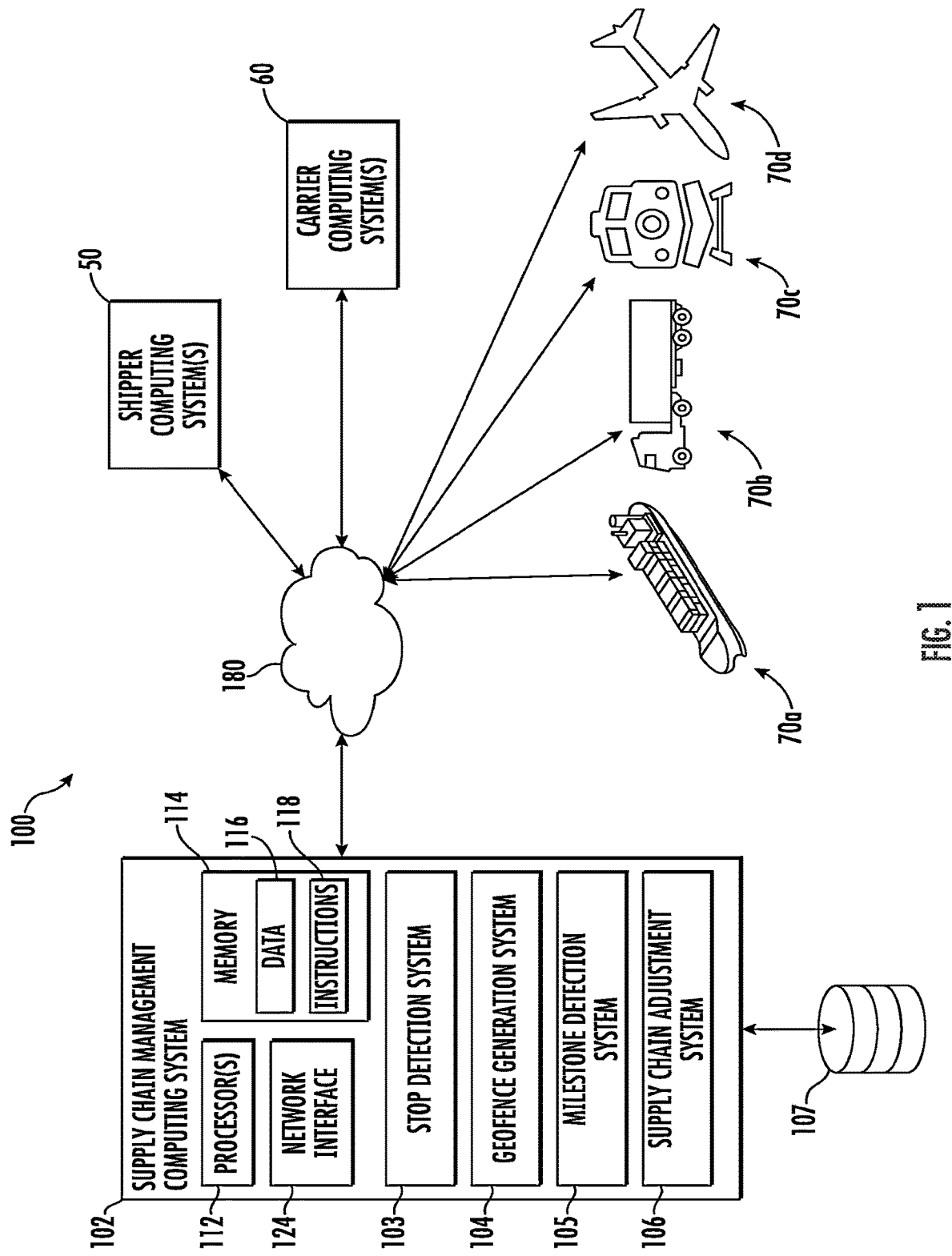
FIG. 1 depicts a block diagram of an example computing system for supply chain management according to example embodiments of the present disclosure.

Generally, aspects of the present disclosure are directed to a supply chain management computing system that provides predictive supply chain visibility. In particular, in some implementations, the supply chain management computing system can provide a platform through which shippers can view and manage their shipments (e.g., as provided by one or more carriers) and/or other supply chain operations or parameters. Thus, the platform can enable and allow shippers to track and trace global supply chain materials, products, or other items that are being shipped anywhere in the world at the inventory level. This service can generally be referred to as "supply chain visibility" or "transport visibility."

Aspects of the present disclosure are directed to technologies which enable the supply chain management computing system to provide "predictive" transport visibility. Specifically, predictive transport visibility refers to the use of predictive technologies (e.g., which may be underpinned by machine learning, artificial intelligence, and/or intelligent algorithmic approaches) to predict various aspects of the supply chain based on available data (e.g., which may be incomplete and/or inaccurate). Typically, the predictions can improve the accuracy of the information available through the platform and/or produce new insights not otherwise discernable from the underlying data. Thus, predictive transport visibility can allow a shipper to accurately track inventory in transit with increased confidence in its arrival. This increased accuracy can enable shippers to proactively manage customer expectations, adjust interrelated supply chain operations, and/or the like, resulting in improved efficiency and customer experience.

Specifically, the present disclosure is directed to systems and methods that impute missing shipment milestones using vehicle tracking data (e.g., global positioning system (GPS) data, automatic identification system (AIS) data, and/or the like). In particular, the present disclosure provides improved techniques to impute when a shipping vehicle (and the cargo loaded thereon) has arrived at a transportation location (e.g., port). In some implementations, the milestone imputation process first includes collecting a historical sample of the vehicle tracking data. Next, density-based clustering methods can be applied to identify vessel stops. This historical set of vessel stops can then be further clustered in order to identify individual docking or loading/unloading locations for all the transportation locations around the world. Once these docking locations have been identified, a geofence can be established around those locations and used to determine when a shipping vehicle has arrived at the corresponding transportation location and/or docking location.

Furthermore, in some implementations, the supply chain management computing system can also predict or otherwise update additional information regarding the item of cargo based on the imputed shipment milestone(s), including, as examples, a current location of the item of cargo, a predicted date of discharge for the item of cargo at the destination, predicted identities of the shipment vehicle(s), and/or the like. As such, the imputed shipment milestone(s) can be used to predict and improve the accuracy of data that is downstream or otherwise reliant upon the accuracy of the shipment event data. Such improved downstream data can then be used to make adjustments to various aspects of the supply chain as a whole (e.g., in an automated and/or intelligent fashion). For example, other alerts and tasks can be automatically performed as well, such as, for example, automated billing operations based on the imputed shipment milestone(s).

Thus, aspects of the present disclosure provide a solution for incomplete or inaccurate event data for shipments (e.g., containers transported via an ocean-going container ship). In particular, through prediction of missing shipment milestones, aspects of the present disclosure enable predictive visibility into shipment status, thereby enabling proactive supply chain management actions which improve supply chain efficiency and the customer experience. For example, a shipper of the item of cargo can access the updated data record (e.g., via a web application or platform supplied by the supply chain management computing system) to receive the updated information regarding the item of cargo and/or the supply chain management computing system can provide notifications, alerts, and/or the like to the shipper. This can enable the shipper to better optimize the supply chain to reflect or account the updated itinerary of the item of cargo.

With reference now to the Figures, example embodiments of the present disclosure will be discussed in further detail.

Example Devices and Systems

FIG. 1 depicts a block diagram of an example system 100 for supply chain management. The system 100 includes a supply chain management computing system 102, one or more shipper computing systems 50, and one or more carrier computing systems 60 that are communicatively connected over one or more networks 180.

Each shipper computing system 50 can be associated with a shipper that has contracted with or otherwise acquired the services of a carrier to provide shipment services relative to one or more items of cargo. A shipper computing system 50 can include any number of computing devices such as laptops, desktops, personal devices (e.g., smartphones), server devices, etc.

Likewise, each of the carrier computing systems 60 can be associated with a carrier that has contracted with or otherwise agreed to supply shipment services to a shipper. A carrier computing system 60 can include any number of computing devices such as laptops, desktops, personal devices (e.g., smartphones), server devices, etc.

Generally, a carrier can operate or charter one or more shipment vehicles (e.g., vehicles 70 *a-d*) to provide shipment services. Shipment vehicles can include ships 70 *a* (e.g., oceangoing ships such as container ships, river barges, etc.); ground-based vehicles 70 *b* (e.g., long haul trucks, vans, cars, etc.); rail-based vehicles 70 *c* (e.g., railcars or freight trains); aircraft (e.g., air freight vehicles, commercial airlines, drones, etc.); spacecraft; and/or other forms of vehicles. The vehicles 70 *a-d* can be humanly operated vehicles and/or can be autonomous vehicles.

Transshipment of cargo can be performed between two vehicles of the same transportation modality (e.g., ship to ship) or between two vehicles of different transportation modalities (e.g., ship to rail).

In some instances, certain vehicles 70 *a-d* may be known to be related to certain other vehicles 70 *a-d*. As one example, a first vehicle may be known to be related to a second vehicle if both the first vehicle and the second vehicle are operated by the same carrier. As another example, a first vehicle may be known to be related to a second vehicle if both the first vehicle and the second vehicle are included within and operate in accordance with a shared carrier network. More particularly, certain carriers may agree to participate or align with each other within a carrier network, for example, for reasons of efficiency, increased global reach, or the like. This network may take the form of an alliance, partnership, contractual arrangement, or the like which enables cargo to be transshipped among network participant vehicles with reduced administrative overhead. Thus, despite being operated by different carriers, a first vehicle may be known to be related to a second vehicle if the two different carriers are aligned within a carrier network. Information about vehicle relations can be stored in any of the different illustrated computing systems or can be accessed from a third party information system (not shown).

The supply chain management computing system 102 can provide a platform via which a shipper can track and trace global supply chain materials, products, or other items that are being shipped anywhere in the world at the inventory level. Tracking at the inventory level can include tracking individual items of inventory (e.g., a specific parcel), tracking certain containers (e.g., a specific container), and/or tracking larger bulk commodities such as a large volume of oil, grain, etc. The platform can be provided as or via a web application, an application run at a shipper computing system 50 (e.g., for which the computing system 102 serves as a backend), and/or via other techniques.

The supply chain management computing system 102 can include any number of computing devices such as laptops, desktops, personal devices (e.g., smartphones), server devices, etc. Multiple devices (e.g., server devices) can operate in series and/or in parallel.

The supply chain management computing system 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM. ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the supply chain management computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

The supply chain management computing system 102 can also include a network interface 124 used to communicate with one or more systems or devices, including systems or devices that are remotely located from the supply chain management computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

In general, the supply chain management computing system 102 can receive and synthesize information from each of the shipper computing systems 50, the carrier computing systems 60, and/or shipment vehicles 70 a-d to produce reports, data tables, status updates, alerts, and/or the like that provide information regarding the current and predicted status of shipments, including, for example, at the container (e.g., twenty-foot equivalent unit container) and/or item of cargo level. In some implementations, communications between the system 102 and one or more of the shipper computing systems 50, the carrier computing systems 60, and/or shipment vehicles 70 a-d can occur via or according to one or more application programming interfaces (APIs), to facilitate automated and/or simplified data acquisition and/or transmission.

As one example communication, the supply chain management computing system 102 can receive itinerary data that has been produced by a carrier for the shipment of an item of cargo. The supply chain management computing system 102 can receive the itinerary data directly from the carrier (e.g., from a carrier computing system 60) or the itinerary data can be received by the shipper from the carrier and then supplied by the shipper to the supply chain management computing system 102 (e.g., using a shipper computing system 50).

The itinerary data can describe various attributes or characteristics of the planned shipment. As an example, an itinerary can provide information regarding a route the shipment may take (e.g., by specifying the origin and/or destination of one or more shipping legs); identification of one or more shipping vehicles that will perform the shipment (e.g., the specific identification names, numbers, or codes (vehicle IDs) of one or more shipping vehicles that will carry the cargo); planned shipment dates (e.g., estimated dates of departure and/or arrival for the one or more shipping legs); identification of one or more particular containers in which the cargo will be shipped, stored, or otherwise housed (container IDs); and/or other information. As one example, the itinerary data can take the form of an EDI message (e.g., received via or according to an API) that provides scheduling and itinerary information related to a shipping vehicle such as an ocean vessel.

However, many carriers provide incomplete and/or inaccurate itineraries for shipments. These incomplete and/or inaccurate itineraries can result in suboptimal performance of the corresponding supply chain. In many cases, the piece of information that is missing or incorrect in the carrier-supplied itinerary is a transshipment location (or a reliable indication that there will not be any transshipment locations).

A transshipment location describes a location where an item of cargo (e.g., as included within a container) is discharged from a shipping vehicle and loaded (either directly or after a holding period) onto a different shipping vehicle, before ultimately arriving at its destination. Thus, in one example, the itinerary data may identify only the origin shipping vehicle that will receive or load the item of cargo at the origin location. However, similar to lack of transshipment information, the itinerary data may fail to identify further vehicles that will transport the item of cargo from the transshipment location to another location (e.g., another transshipment location or the destination). In another example, the itinerary data may identify only a subsequent shipping vehicle that will receive the cargo at some point in the future, but may not identify the origin shipping vehicle or the location at which the subsequent shipping vehicle obtains the cargo (e.g., via transshipment). Thus, the shipping vehicle(s) identified by the itinerary data may be incomplete and may include various vehicles that are expected to be used at different stage(s) of the shipment.

As another example communication, the supply chain management computing system 102 can receive or obtain vehicle location data. The vehicle location data can be or include vehicle schedule data, vehicle tracking data, in-house schedule data that is developed in-house by the entity that operates the supply chain management computing system, and/or data regarding the location of a vehicle gleaned from itinerar(ies) associated with other, different items of cargo.

Thus, one type of vehicle location data is vehicle schedule data. The vehicle schedule data can provide a respective schedule for each vehicle 70 a-d. The schedule can provide a list of transportation locations (e.g., ports, railyards, distribution centers, trucking depots, etc.) that the vehicle has or is scheduled to visit. In some instances, certain scheduled dates may be associated with the scheduled locations provided by the vehicle schedule data for the vehicle. Often, however, the date information in the vehicle schedule data is inaccurate (e.g., fails to reflect/account for delays which have caused the date information to be outdated/inaccurate). Similarly, vehicle schedule data can be incomplete (e.g., missing certain intermediate stops or locations).

Similarly to the itinerary data, in some implementations, the supply chain management computing system 102 can receive the vehicle schedule data directly from the carrier (e.g., from a carrier computing system 60). Alternatively, the vehicle schedule data can be received by the shipper from the carrier and then supplied by the shipper to the supply chain management computing system 102 (e.g., using a shipper computing system 50). As another possibility, a third party service (not shown) may maintain and supply (e.g., via an API) vehicle schedule data on behalf and/or in collaboration with carriers.

In some implementations, carriers can provide updated vehicle schedule data periodically (e.g., daily). In some implementations, similarly to the itinerary data, the vehicle schedule data can take the form of an EDI message.

Another type of vehicle location data is vehicle tracking data. In particular, as another example communication, the supply chain management computing system 102 can receive or obtain vehicle tracking data associated with the vehicles 70 a-d. Vehicle tracking data can include data generated by the vehicles 70 a-d or devices located on the vehicles 70 a-d that describe a current location of the vehicles 70 a-d. The vehicle tracking data can be received by the supply chain management computing system 102 directly from the vehicles or can be sent from the vehicles to other computing systems (e.g., a carrier computing system 60, a third party database, etc.) before being collected or obtained by the supply chain management computing system 102.

In some implementations, the vehicle tracking data can include or be formatted as a number of vehicle tracking entries that are transmitted/collected over time. For example, each vehicle tracking entry can include various information about the shipping vehicle at a particular time (which may, for example, be represented via a timestamp associated with the vehicle tracking entry. As examples, the information included in a vehicle tracking entry can include a timestamp, location (e.g., latitude and longitude, street address, relative location, or other location identifiers), speed of the vehicle, heading, orientation, and/or various other forms of tracking information).

As one example, vehicle tracking data can include automatic identification system (AIS) data. The AIS is an automatic tracking system that uses transponders on ships to identify the current locations (e.g., with some margin of error) of the ships. Information provided by AIS equipment, such as unique identification, position, course, and speed, can be obtained by the carrier computing systems 60 and/or a third party system (not shown) and supplied (e.g., via an API) to the supply chain management computing system 102.

As another example, vehicle tracking data can include satellite positioning data (e.g., GPS data) or similar (e.g., data from transponders or other mobile communications devices present on the vehicles). As yet another example, vehicle tracking data can include tracking data generated from an electronic device (e.g., smartphone) associated with an operator (e.g., driver) of the shipping vehicle.

Another type of vehicle location data is data regarding the location of a vehicle gleaned from shipping data associated with other, different items of cargo. For example, a carrier may supply a shipping data for an Item of Cargo A that fails to identify a shipment milestone for the Item of Cargo A, but does indicate that the Item of Cargo A will be shipped using Shipping Vehicle A. However, for an Item of Cargo B, the same or different carrier may indicate that Item of Cargo B will be shipped using Shipping Vehicle A. and further that Shipping Vehicle A has or will be visiting Location A at a given time. This information can be used to determine milestone for Shipping Vehicle A. In particular, it can be determined that Shipping Vehicle A has or will visit Location A and such information can be used to impute a milestone for Item of Cargo A, thereby resolving the failure of the first shipping data to identify a shipment milestone associated with Location A.

According to aspects of the present disclosure, the supply chain management computing system 102 can include a stop detection system 103, a geofence generation system 104, a milestone detection system 105, and a supply chain adjustment system 106. The operations of each of these systems are discussed in greater detail elsewhere herein.

The stop detection system 103 can detect when a shipping vehicle has stopped based on vehicle tracking data associated with the shipping vehicle or, stated differently, can determine whether a particular vehicle tracking entry is indicative of a stopped vehicle or a moving vehicle. For example, the vehicle tracking data can be current (e.g., real time) vehicle tracking data and/or historical vehicle tracking data (e.g., collected and stored over time).

As one example, the stop detection system 103 can detect when a shipping vehicle has stopped by applying a filter to the vehicle tracking data. For example, the filter can be a speed filter (e.g., a low pass speed filter) that filters out any vehicle tracking entries that provide a speed that is greater than a threshold. Application of such a filter can produce filtered vehicle tracking entries, where the filtered vehicle tracking entries include only vehicle tracking entries that describe speeds below the threshold speed. In such fashion, the vehicle tracking entries can be filtered to identify entries that correspond to instances in which the shipping vehicle is stopped (as indicated by the speed value of low magnitude). A stop may be detected for each of the filtered entries or for each continuous sequence of filtered entries.

In some implementations, the stop detection system 103 can include and use one or more machine-learned stop detection models to detect vehicle stops from the vehicle tracking data or filter the vehicle tracking data. For example, the machine-learned stop detection model(s) can be configured to receive and process vehicle tracking data to produce vehicle stop detections. For example, the machine-learned stop detection models can be configured to receive and process one or more vehicle tracking entries to predict whether the corresponding shipping vehicle is stopped. The model prediction can be used to filter out entries that do not (per the model's prediction) correspond to stopped vehicles. The machine-learned stop detection model(s) can be trained on training data that includes vehicle tracking data or entries that are labelled with a ground truth indication of whether the corresponding shipping vehicle was stopped or not stopped at the particular time associated with such vehicle trucking data or entries.

In some implementations, the stop detection system 103 can additionally or alternatively apply or perform various other filters or filtering logic. For example, in some implementations, a stop may be detected only when multiple sequential entries (e.g., 3 sequential entries) or a certain number of entries out of a sequence of entries (e.g., 5 out of 7 sequential entries) pass the filter. Thus, in such implementations, vehicle stops may be detected only when multiple filtered entries indicate that the vehicle has stopped for a sustained period of time. Likewise, other characteristics of the vehicle tracking data can be used to filter the entries. For example, in some implementations, a vehicle may be detected as stopped only if its heading (e.g., as indicated by the vehicle tracking data) matches a certain range of headings and/or if its heading (e.g., as indicated by the vehicle tracking data) remains consistent for a certain number of entries (e.g., out of a sequence of entries).

The stop detection and filtering process described above is an optional approach to reduce the volume of vehicle tracking data to only data indicative of stops, which can then be subject to further downstream processing. Other techniques can be performed as well, or, in other implementations, no filtering may be performed. As such, for the remainder of the discussion with reference to FIG. 1, references to "vehicle tracking data" or "vehicle tracking entries" should be read to include reference to raw (unfiltered) vehicle tracking data or entries and/or filtered vehicle tracking data or entries.

Figure 8:
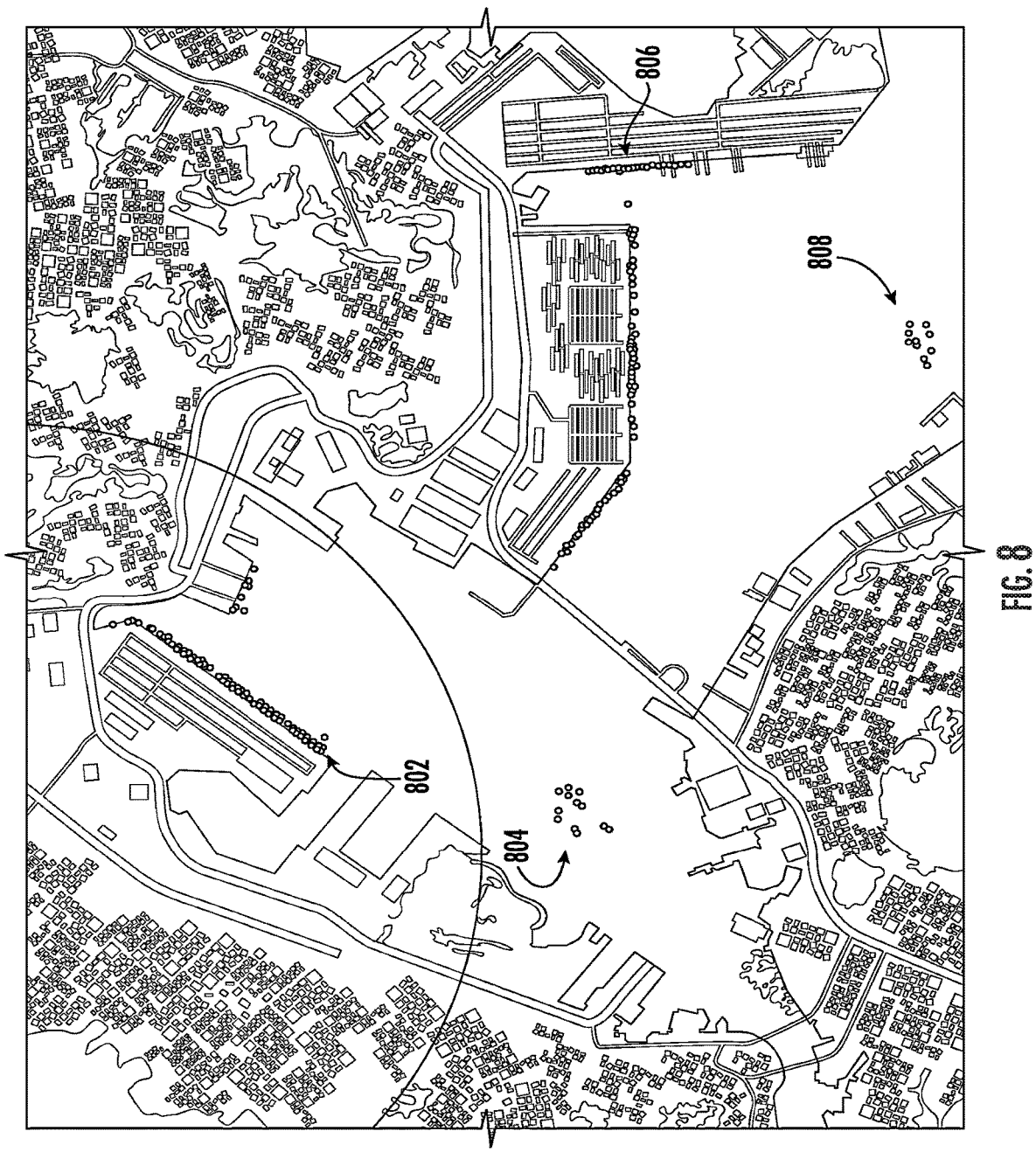
FIG. 8 depicts an example set of vehicle tracking data overlaid upon satellite imagery of a transportation location according to example embodiments of the present disclosure.

As one example, FIG. 8 depicts an example set of vehicle tracking data overlaid upon satellite imagery of a transportation location according to example embodiments of the present disclosure. In particular, FIG. 8 illustrates filtered vehicle tracking entries for a particular shipping port in Busan. Korea. Specifically, each illustrated datapoint corresponds to a filtered vehicle tracking entry.

FIG. 8 illustrates a challenge that remains even when vehicle tracking data is successfully filtered to retain only entries associated with vehicle stops. In particular, in various scenarios, such as shipping ports, trucking depots, railyards, etc., it may be common for all of the docking or loading/unloading areas to be taken or occupied. As such, shipping vehicles hoping to use a loading/unloading area may end up waiting in a certain waiting location for a spot to open. In the context of maritime shipping vessels, such a waiting location may in some instances be referred to as a "pilot station" or "anchorage point." For example, in the context of maritime shipping vessels, this distinction can be referred to as a vessel waiting to berth versus a vessel at berth.

The above described dynamic is visible within the vehicle stop data illustrated in FIG. 8. In particular, while data entries shown generally and 802 and 806 correspond to shipping vehicles that are stopped at a loading/unloading area, the data entries shown generally at 804 and 808 correspond to shipping vehicles that are stopped at a waiting location and that a waiting for a loading/unloading location to become available.

This dynamic presents a challenge when using vehicle tracking data to identify the locations of loading/unloading areas because the data that corresponds to waiting areas can result in a large number of false positives. Stated differently, if it were naively assumed that any location where there were filtered vehicle data entries corresponded to a loading/unloading area, then the data from waiting locations (e.g., the entries shown generally at 804 and 808) would result in a false positive for a loading/unloading area.

Aspects of the present disclosure are directed to geofence generation techniques which overcome this and other challenges to generate geofences that correspond to transportation locations (e.g., loading/unloading areas) rather than waiting areas. Specifically, aspects of the present disclosure describe the use of one or more clustering techniques to assist in reducing false positives from waiting locations.

As one example, clustering the data in both location and time can result in reduced false positives. In particular, because the waiting locations will typically have sequences of data entries that persist a relatively shorter period of time (e.g., one hour) versus data entries from a true loading/unloading event (e.g., one day), clustering based on time may remove data entries from waiting locations.

As another example, in some implementations, two or more clustering techniques can be performed sequentially, which may in some instances be referred to as "clustering within the clusters." Performing multiple clustering techniques in such fashion (e.g., with different clustering parameters such as different "eps" values and/or clustering over different data attributes such as time versus distance) may also enable false positives to be reduced.

In particular, referring again to FIG. 1, the geofence generation system 104 can generate a plurality of geofences respectively for a plurality of transportation locations (e.g., ports, railyards, distribution centers, trucking depots, etc.) based on the vehicle tracking data and/or other vehicle location data. The geofence for each transportation location can include or correspond to a virtual perimeter around such transportation location. For example, a geofence can describe a virtual perimeter that encloses an area, where vehicles or other objects that are located within the perimeter/area (e.g., as evidenced by vehicle tracking data) can be said to be located at the corresponding transportation location. The geofences for a maritime transportation location can correspond to a specific port (e.g., Port of Seattle), specific port terminals (e.g., Port of Seattle, Terminal 5), or specific vessel berths (e.g., Port of Seattle. Terminal 5, Berth 2).

In some implementations, the geofence generation system 104 can perform one or more clustering techniques on the vehicle tracking data to determine the geofence(s) for a particular transportation location. Clustering refers to the task of grouping a set of objects in such a way that objects in the same group (called a cluster) are more similar (in some sense) to each other than to those in other groups (clusters). One example class of clustering techniques that can be performed is density-based clustering. In density-based clustering, clusters are defined for areas with a higher density of datapoints than the remainder of the data set. Objects in sparse areas are usually considered to be noise and border points.

One example density-based clustering technique is density-based spatial clustering of applications with noise (DBSCAN). Given a set of points in some space, DBSCAN groups together points that are closely packed together (points with many nearby neighbors), marking as outliers points that lie alone in low-density regions (whose nearest neighbors are too far away). Some implementations of DB SCAN and other clustering algorithms operate on the basis of one or more of the following parameters. One example clustering parameter is the two parameters: epsilon or "eps" parameter which: specifies how close points should be to each other to be considered a part of a cluster. If the distance between two datapoints is lower or equal to this value (eps), these points are considered neighbors. Another example clustering parameter is the minPoints parameter: which controls the minimum number of points to form a dense region. For example, if the minPoints parameter is set to 5, then at least 5 points are needed to form a dense region. Another example clustering parameter is the distance metric that should be used to compute distance (e.g., when applying the eps parameter). For example, for calculating distance between two pairs of latitude and longitude, one example distance metric is a Haversine distance. As another example, for calculating the distance between two points in time, one example distance metric is a Euclidean distance.

In some example implementations, the geofence generation system 104 can perform multiple clustering techniques in sequence in order to identify the transportation locations. As one example, the geofence generation system 104 can perform a first clustering technique on the vehicle tracking data to identify a plurality of first clusters. The plurality of first clusters can be indicative of a plurality of stop locations at which shipping vehicles have historically stopped. Thus, in some instances, the performance of the first clustering technique can also be considered as an additional part of or an alternative to the example stop detection techniques described above such as application of various filter(s).

Furthermore, the geofence generation system 104 can perform a second clustering technique on the plurality of first clusters to identify a plurality of second clusters. For example, the second clustering technique can be performed on the data entries that were included in the plurality of first clusters, on respective centroids of the first clusters, or other forms of data extracted from or relevant to the first clusters. The plurality of second clusters can be indicative of a plurality of transportation locations at which the one or more shipping vehicles are subject to loading or unloading of cargo.

In some implementations, the multiple clustering techniques can be performed with different parameters and/or on or relative to different data attributes. As one example, in some implementations, the first clustering technique to identify the plurality of first clusters can be performed with respect to distance and/or time. As another example, in some implementations, the second clustering technique to identify the plurality of second clusters can be performed with respect to distance only. Likewise, in some implementations, the first clustering technique can be performed with a relatively larger value for the eps parameter and/or minPoints parameter than the second clustering technique or vice versa.

As one example. FIG. 9 depicts example set of clusters determined for the vehicle tracking data of FIG. 8 according to example embodiments of the present disclosure. In particular, as illustrated in FIG. 9, respective clusters have been identified for the data entries shown generally and 802 and 806 which correspond to shipping vehicles that are stopped at a loading/unloading area. However, no clusters have been determined for the data entries shown generally at 804 and 808 that correspond to shipping vehicles that are stopped at a waiting location and that are waiting for a loading/unloading location to become available.

Referring again to FIG. 1, the geofence generation system 104 can define one or more geofences for each of the plurality of transportation locations based at least in part on the clusters generated through performance of the clustering technique(s). As one example, for each cluster in the plurality of clusters (e.g., the plurality of second clusters), a perimeter of a geofence can be drawn around the data entries that are included in such cluster. The perimeter can be tightly fit against the data entries (e.g., have a number of sides that extend between respective data entries in the cluster so as to minimize an area included within the perimeter), can be defined by increasing the radius of a circle centered at a centroid of the cluster until all data entries of the cluster are included in the circle, or can be defined in other manners.

In some implementations, geofences can be defined only for clusters (e.g., second clusters) that satisfy some number (e.g., 1, half, all) of a set of criteria. As one example, a cluster (e.g., second cluster) can be discarded if, upon analysis of satellite imagery, its centroid and/or perimeter is too far away from pixels of the imagery that have been labeled (e.g., by a machine-learned segmentation model and/or by a human) as corresponding to the transportation location, land, railways, buildings, etc. Additional example criteria include a size criterion (e.g., a cluster can be rejected if its geographical size is greater than a threshold value), a percent filled criterion (e.g., a cluster can be rejected if the percentage of the cluster's geographic area that does not include data entries is greater than a threshold percentage), a member size criterion (e.g., a cluster can be rejected if it has more than a threshold number of members), and/or other criteria. In some implementations, a cluster (e.g., second cluster) can be iteratively modified (e.g., by changing a density or eps parameter and re-clustering) until it (or some or all of its child or sub-clusters) satisfy the criteria. The child or sub-clusters of a cluster (or the respective mean or medians thereof) can be used to define the geofence for the cluster. For example, a union of the respective geographic areas covered by the sub-clusters can be used as the geofence for the original cluster and/or the respective geographic areas covered by the sub-clusters can be treated as independent geofences.

In some implementations, the geofence generation system 104 can include and use one or more machine-learned geofence generation models to generate geofences. For example, the machine-learned geofence generation models can be configured to receive and process vehicle tracking data to generate geofences for the transportation locations. For example, the machine-learned geofence generation models can directly produce the geofences or can produce clusters of data entries that correspond to transportation locations and which can be used to generate the geofences.

Once the geofences have been generated for the transportation locations, the geofence data (e.g., data descriptive of each geofence's perimeter or area) can be stored (e.g., in the database 107) for later usage. Geofences can be periodically added and/or deprecated over time based on an analysis (e.g., as described herein) of rolling windows of vehicle tracking data (e.g., geofences can be added, updated, and/or deprecated each month based on vehicle tracking data received during the past month).

Geofences can be assigned or correlated to certain transportation locations (e.g., Terminal 3, Berth 2) through an automated process and/or via human labeling. In one example, an automated process can compare the centroid of each cluster/geofence to a particular location that is associated (e.g., in a geographic information system, in map data, and/or with user-generated location pins) with particular transportation locations. In another example, an association between a cluster/geofence and a particular transportation location can be inferred by correlating vehicle tracking data with other forms of vehicle data (e.g., itinerary data, late event update data, and/or the like) which may be late, but accurate.

The milestone detection system 105 can detect the occurrence of milestone events through application of the geofences. For example, the milestone detection system 105 can obtain new vehicle tracking data from a particular shipping vehicle, wherein the new vehicle tracking data indicates a current location of the particular shipping vehicle. The milestone detection system 105 can compare the current location of the particular shipping vehicle to at least one geofence of the one or more geofences defined for the plurality of transportation locations to determine whether the particular shipping vehicle is present at the respective transportation location associated with the at least one geofence.

In response to a determination that the particular shipping vehicle is present at the respective transportation location associated with the at least one geofence, the milestone detection system 105 can insert a data entry into a data record (e.g., stored in database 107) that is associated with the particular shipping vehicle and/or an item of cargo on the shipping vehicle. The data entry can indicate that the particular shipping vehicle is present at the respective transportation location associated with the at least one geofence.

As another example, in response to a determination that a particular shipping vehicle that was previously present at the respective transportation location associated with the at least one geofence is no longer present at such transportation location, the milestone detection system 105 can insert a data entry into a data record (e.g., stored in database 107) that is associated with the particular shipping vehicle and/or an item of cargo on the shipping vehicle. The data entry can indicate that the particular shipping vehicle is no longer present at the respective transportation location associated with the at least one geofence. Thus, milestones can include arrival and/or departure milestones.

In some implementations, the new vehicle tracking data can be filtered (e.g., using a low pass speed filter) that filters out any new vehicle tracking entries that provide a speed that is greater than a threshold. Application of such a filter can produce filtered new vehicle tracking entries, where the filtered new vehicle tracking entries include only new vehicle tracking entries that describe speeds below the threshold speed. In such fashion, the new vehicle tracking entries can be filtered to identify entries that correspond to instances in which the shipping vehicle is stopped (as indicated by the speed value of low magnitude). A stop may be detected for each of the filtered new entries or for each continuous sequence of filtered new entries.

In some implementations, presence of a shipping vehicle at a transportation location can be detected or predicted upon any instance of one of the new vehicle tracking entries associated with the shipping vehicle providing a location that is within the geofence associated with such transportation location. In other implementations, a certain confidence may need to be built in order to detect or predict presence of the vehicle at the transportation location. For example, presence of the vehicle at the transportation location may be detected only when multiple sequential entries (e.g., 3 sequential entries) or a certain number of entries out of a sequence of entries (e.g., 5 out of the last 7 sequential entries) provide locations that are within the corresponding geofence.

In some implementations, the milestone detection system 105 can include and use one or more machine-learned milestone detection models to detect milestones. For example, the machine-learned milestone detection models can be configured to receive and process new vehicle tracking data to produce predictions regarding the occurrence of milestones.

The supply chain adjustment system 10 can perform automatic supply chain adjustments based on the imputed milestones. As examples, the supply chain adjustment system 106 can proactively detect, share, and resolve shipment issues. For example, the supply chain adjustment system 106 can generate and transmit automatic alerts to the shipper, carrier, and/or customers and/or partners of the shipper that indicate the imputed milestones. The alerts can provide the updated information and, in some implementations, include adjustments to previously provided orders, requests, invoices, and/or the like. Thus, for example, if it is detected based on the imputed milestones that the item of cargo will now be two days earlier, the delivery of materials or products planned to be combined (e.g., in a manufacturing sense) with such item of cargo can be requested to be supplied by other providers two days earlier as well, thereby enabling the most efficient combination of the item of cargo with such materials or products. Likewise, the labor associated with the combination can be automatically scheduled for two days earlier than previously requested. As another example, an invoice can be automatically sent based on the updated itinerary. Thus, in some implementations, logical connections and/or dependencies between multiple different shipments, orders, labor requests, facilities management plans, and/or the like can be established (e.g., by the shipper and/or a customer of the shipper) and these logical connections can be used to perform automatic supply chain adjustments.

In some implementations, the supply chain adjustment system 106 can include and use one or more machine-learned supply chain adjustment models to generate adjustments to one or more facets of a supply chain that are interrelated to the item of cargo based on the updated itinerary. For example, the machine-learned supply chain adjustment models can be configured to receive and process data that describes the original event or itinerary data and the updated event or itinerary data to produce automatic supply chain adjustments (e.g., modification of requested delivery dates or labor fulfillment dates).

Each of the stop detection system 103, the geofence generation system 104, the milestone detection system 105, and the supply chain adjustment system 106 can include computer logic utilized to provide desired functionality. Each of the stop detection system 103, the geofence generation system 104, the milestone detection system 105, and the supply chain adjustment system 106 can be implemented in hardware, firmware, and/or software controlling a general purpose processor. For example, in some implementations, each of the stop detection system 103, the geofence generation system 104, the milestone detection system 105, and the supply chain adjustment system 106 includes program files stored on a storage device, loaded into a memory and executed by one or more processors. In other implementations, each of the stop detection system 103, the geofence generation system 104, the milestone detection system 105, and the supply chain adjustment system 106 includes one or more sets of computer-executable instructions that are stored in a tangible computer-readable storage medium such as RAM hard disk or optical or magnetic media.

The database 107 can be one database or multiple databases. If multiple databases are used, they can be co-located or geographically distributed. The database 107 can store any and all of the different forms of data described herein and can be accessed and/or written to by any of the systems 103-106. In some implementations, the database 107 can also store historical shipping data that can be used, for example, as training data for any of the machine-learned models described herein and/or as the basis for imputing certain information for current shipping data. For example, the historical shipping data (e.g., historical vehicle tracking data) can be collected and stored (e.g., in the database 107) over time.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2:
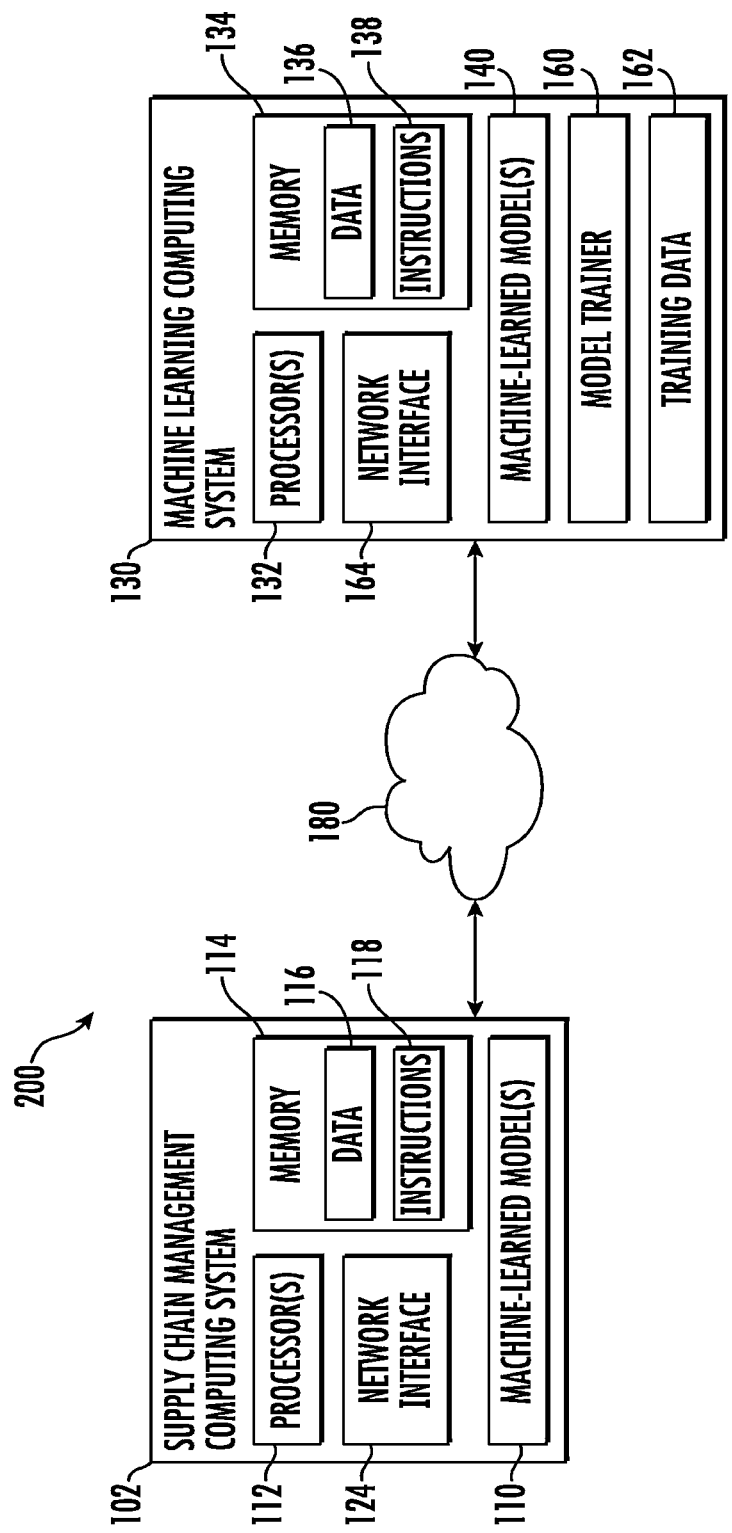
FIG. 2 depicts a block diagram of an example computing system for using and enabling machine-learned models according to example embodiments of the present disclosure.

As described above, in some implementations, some or all of the stop detection system 103, the geofence generation system 104, the milestone detection system 105, and the supply chain adjustment system 106 can include one or more machine-learned models. FIG. 2 depicts an example computing system 200 for enabling the stop detection system 103, the geofence generation system 104, the milestone detection system 105, and/or the supply chain adjustment system 106 to include machine learning components according to example embodiments of the present disclosure. The example system 200 can be included in or implemented in conjunction with the example system 100 of FIG. 1. The system 200 includes the supply chain management computing system 102 and a machine learning computing system 130 that are communicatively coupled over the network 180.

As illustrated in FIG. 2, in some implementations, the supply chain management computing system 102 can store or include one or more machine-learned models 110 (e.g., any of the models discussed herein). For example, the models 110 can be or can otherwise include various machine-learned models such as a random forest model; a logistic regression model; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

In some implementations, the supply chain management computing system 102 can receive the one or more machine-learned models 110 from the machine learning computing system 130 over network 180 and can store the one or more machine-learned models 110 in the memory 114. The supply chain management computing system 102 can then use or otherwise implement the one or more machine-learned models 110 (e.g., by processor(s) 112).

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the supply chain management computing system 102, the machine learning computing system 130 can include one or more machine-learned models 140. For example, the models 140 can be or can otherwise include various machine-learned models such as a random forest model; a logistic regression model; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

As an example, the machine learning computing system 130 can communicate with the supply chain management computing system 102 according to a client-server relationship. For example, the machine learning computing system 140 can implement the machine-learned models 140 to provide a web service to the supply chain management computing system 102. For example, the web service can provide a transshipment location prediction service and/or other machine learning services as described herein.

Thus, machine-learned models 110 can be located and used at the supply chain management computing system 102 and/or machine-learned models 140 can be located and used at the machine learning computing system 130.

In some implementations, the machine learning computing system 130 and/or the supply chain management computing system 102 can train the machine-learned models 110 and/or 140 through use of a model trainer 160. The model trainer 160 can train the machine-learned models 110 and/or 140 using one or more training or learning algorithms. One example training technique is backwards propagation of errors ("backpropagation"). For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The model trainer 160 can be implemented in hardware, software, firmware, or combinations thereof.

The training data 162 can include, for example, historical data that indicates the historical outcomes of various previous shipments (e.g., which may take the form of shipping logs). In some implementations, the training data 162 can include a plurality of training example pairs, where each training example pair provides: (1) a set of data (e.g., incorrect and/or incomplete data); and (2) a ground truth label associated with such set of data, where the ground truth label provides a "correct" prediction for the set of data. For example, the training example can include: (1) itinerary and/or vehicle event data that was collected prior or during a shipment; and (2) a ground truth label derived from historical data that indicates what the actual itinerary or events were for such shipment.

As one example, a training example pair can include: (1) vehicle tracking entries; and (2) ground truth labels for whether each vehicle tracking entry corresponds to a stopped vehicle or a vehicle in transit. As another example, a training example pair can include: (1) vehicle tracking entries (e.g., filtered entries); and (2) ground truth labels for whether each vehicle tracking entry corresponds to a vehicle at a transportation location or a vehicle at a waiting area. As another example, a training example pair can include: (1) vehicle tracking entries (e.g., filtered entries); and (2) ground truth clusters that correspond to transportation locations at which the vehicles are stationed, docked, parked, etc. As another example, a training example pair can include: (1) vehicle tracking entries (e.g., filtered entries); and (2) ground truth geofences that correspond to transportation locations at which the vehicles are stationed, docked, parked, etc. As another example, a training example pair can include: (1) vehicle tracking entries (e.g., filtered entries); and (2) ground truth labels that correspond to whether each vehicle tracking entry correspond to a newly achieved milestone. As yet another example, a training example pair can include: (1) an original set of itinerary or event data and changes to such itinerary or event data (e.g., addition of milestone events); and (2) additional updates to the itinerary (e.g., predicted new discharge dates, etc.). As another example, a training example pair can include: (1) data that describes an original itinerary or event set and an updated itinerary or event set (e.g., including predicted new arrival or departure events, predicted new discharge dates, etc.); and (2) automatic supply chain adjustments (e.g., modification of requested delivery dates or labor fulfillment dates) that should be performed based on change from the original itinerary to the updated itinerary.

FIG. 2 illustrates one example computing system 200 that can be used to implement the present disclosure. Other computing systems can be used as well. For example, in some implementations, the supply chain management computing system 102 can include the model trainer 160 and the training dataset 162. In such implementations, the machine-learned models 110 can be both trained and used locally at the supply chain management computing system 102. As another example, in some implementations, the supply chain management computing system 102 is not connected to other computing systems.

Example Methods

Figure 3:
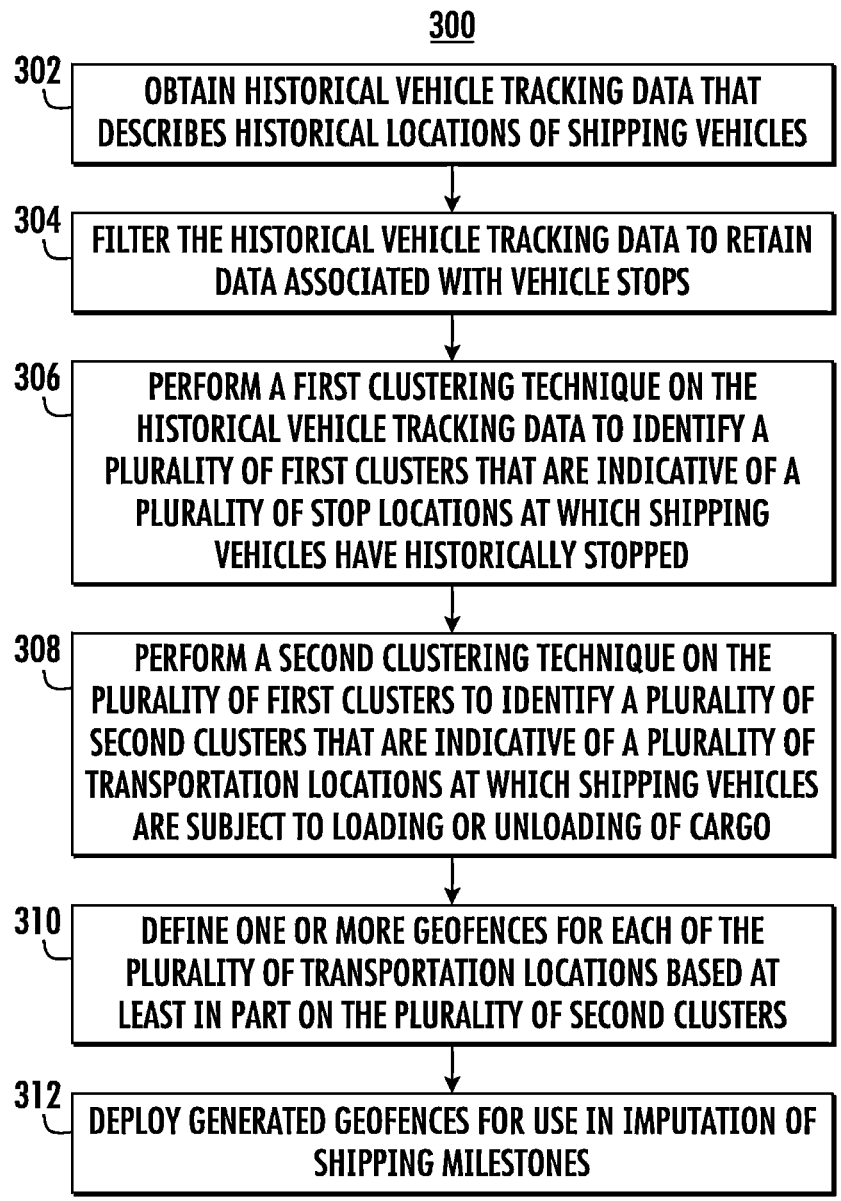
FIG. 3 depicts a flow chart diagram of an example method for determining geofences for transportation locations according to example embodiments of the present disclosure.

FIG. 3 depicts a flow chart diagram of an example method 300 to generate geofences for transportation locations according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain historical vehicle tracking data that describes historical locations of shipping vehicles. In some implementations, the vehicle tracking data can include or be formatted as a number of vehicle tracking entries that are transmitted/collected over time. For example, each vehicle tracking entry can include various information about the shipping vehicle at a particular time (which may, for example, be represented via a timestamp associated with the vehicle tracking entry. As examples, the information included in a vehicle tracking entry can include a timestamp, location (e.g., latitude and longitude, street address, relative location, or other location identifiers), speed of the vehicle, heading, orientation, and/or various other forms of tracking information).

As one example, vehicle tracking data can include automatic identification system (AIS) data. The AIS is an automatic tracking system that uses transponders on ships to identify the current locations (e.g., with some margin of error) of the ships. Information provided by AIS equipment, such as unique identification, position, course, and speed, can be obtained by the carrier computing systems 60 and/or a third party system (not shown) and supplied (e.g., via an API) to the supply chain management computing system 102.

As another example, vehicle tracking data can include satellite positioning data (e.g., GPS data) or similar (e.g., data from transponders or other mobile communications devices present on the vehicles). As yet another example, vehicle tracking data can include tracking data generated from an electronic device (e.g., smartphone) associated with an operator (e.g., driver) of the shipping vehicle.

At 304, the computing system can filter the historical vehicle tracking data to retain data associated with vehicle stops. As one example, the computing system can detect when a shipping vehicle has stopped by applying a filter to the vehicle tracking data. For example, the filter can be a speed filter (e.g., a low pass speed filter) that filters out any vehicle tracking entries that provide a speed that is greater than a threshold. Application of such a tilter can produce filtered vehicle tracking entries, where the filtered vehicle tracking entries include only vehicle tracking entries that describe speeds below the threshold speed. In such fashion, the vehicle tracking entries can be filtered to identify entries that correspond to instances in which the shipping vehicle is stopped (as indicated by the speed value of low magnitude). A stop may be detected for each of the filtered entries or for each continuous sequence of filtered entries.

In some implementations, the computing system can include and use one or more machine-learned stop detection models to detect vehicle stops from the vehicle tracking data or filter the vehicle tracking data. For example, the machine-learned stop detection model(s) can be configured to receive and process vehicle tracking data to produce vehicle stop detections. For example, the machine-learned stop detection models can be configured to receive and process one or more vehicle tracking entries to predict whether the corresponding shipping vehicle is stopped. The model prediction can be used to filter out entries that do not (per the model's prediction) correspond to stopped vehicles. The machine-learned stop detection model(s) can be trained on training data that includes vehicle tracking data or entries that are labelled with a ground truth indication of whether the corresponding shipping vehicle was stopped or not stopped at the particular time associated with such vehicle tracking data or entries.

In some implementations, the computing system can additionally or alternatively apply or perform various other filters or filtering logic. For example, in some implementations, a stop may be detected only when multiple sequential entries (e.g., 3 sequential entries) or a certain number of entries out of a sequence of entries (e.g., 5 out of 7 sequential entries) pass the filter. Thus, in such implementations, vehicle stops may be detected only when multiple filtered entries indicate that the vehicle has stopped for a sustained period of time. Likewise, other characteristics of the vehicle tracking data can be used to filter the entries. For example, in some implementations, a vehicle may be detected as stopped only if its heading (e.g., as indicated by the vehicle tracking data) matches a certain range of headings and/or if its heading (e.g., as indicated by the vehicle tracking data) remains consistent for a certain number of entries (e.g., out of a sequence of entries).

The stop detection and Filtering process described above is an optional approach to reduce the volume of vehicle tracking data to only data indicative of stops, which can then be subject to further downstream processing. Other techniques can be performed as well, or, in other implementations, no filtering may be performed. As such, for the remainder of the discussion with reference to FIG. 1, references to "vehicle tracking data" or "vehicle tracking entries" should be read to include reference to raw (unfiltered) vehicle tracking data or entries and/or Filtered vehicle tracking data or entries.

At 306, the computing system can perform a first clustering technique on the historical vehicle tracking data to identify a plurality of first clusters that are indicative of a plurality of stop locations at which shipping vehicles have historically stopped. At 308, the computing system can perform a second clustering technique on the plurality of first clusters to identify a plurality of second clusters that are indicative of a plurality of transportation locations at which shipping vehicles are subject to loading or unloading of cargo.

In some implementations, the multiple clustering techniques can be performed with different parameters and/or on or relative to different data attributes. As one example, in some implementations, the first clustering technique to identify the plurality of first clusters can be performed with respect to distance and/or time. As another example, in some implementations, the second clustering technique to identify the plurality of second clusters can be performed with respect to distance only. Likewise, in some implementations, the first clustering technique can be performed with a relatively larger value for the eps parameter and/or minPoints parameter than the second clustering technique or vice versa.

At 310, the computing system can define one or more geofences for each of the plurality of transportation locations based at least in part on the clusters generated through performance of the clustering technique(s). As one example, for each cluster in the plurality of clusters (e.g., the plurality of second clusters), a perimeter of a geofence can be drawn around the data entries that are included in such cluster. The perimeter can be tightly fit against the data entries (e.g., have a number of sides that extend between respective data entries in the cluster so as to minimize an area included within the perimeter), can be defined by increasing the radius of a circle centered at a centroid of the cluster until all data entries of the cluster are included in the circle, or can be defined in other manners.

In some implementations, geofences can be defined only for clusters (e.g., second clusters) that satisfy some number (e.g., 1, half, all) of a set of criteria.

Figure 4:
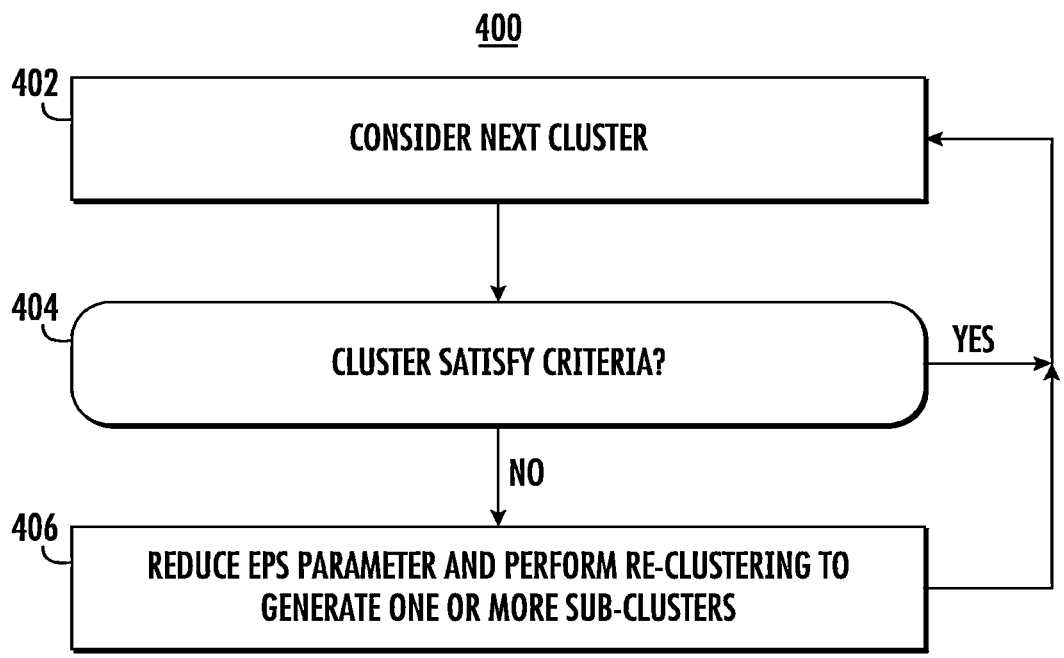
FIG. 4 depicts a flow chart diagram of an example method for determining geofences for transportation locations according to example embodiments of the present disclosure.

As one example, FIG. 4 depicts a flow chart diagram of an example method 400 to impute transshipment locations according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can consider a next cluster. For example, the process 400 can be iterative and at a first instance of 402 the computing system can consider a first cluster of a batch of clusters to be considered.

At 404, the computing system can determine whether the cluster satisfies the criteria. As one example, a cluster (e.g., second cluster) can be discarded if, upon analysis of satellite imagery, its centroid and/or perimeter is too far away from pixels of the imagery that have been labeled (e.g., by a machine-learned segmentation model and/or by a human) as corresponding to the transportation location, land, railways, buildings, etc. Additional example criteria include a size criterion (e.g., a cluster can be rejected if its geographical size is greater than a threshold value), a percent filled criterion (e.g., a cluster can be rejected if the percentage of the cluster's geographic area that does not include data entries is greater than a threshold percentage), a member size criterion (e.g., a cluster can be rejected if it has more than a threshold number of members), and/or other criteria.

If it is determined that the cluster satisfies the criteria, then method 400 can return to 402 and consider the next cluster. However, if the cluster does not satisfy the criteria, then method 400 can proceed to 406.

At 408, the computing system can modify the cluster by changing a density or eps parameter and/or other clustering parameters and re-clustering. The child or sub-clusters of a cluster (or the respective mean or medians thereof) can be used to define the geofence for the cluster. For example, a union of the respective geographic areas covered by the sub-clusters can be used as the geofence for the original cluster and/or the respective geographic areas covered by the sub-clusters can be treated as independent geofences. After 408, the method 400 can return to 402 and consider the next cluster.

Referring again to FIG. 3, in some implementations, at 308 the computing system can include and use one or more machine-learned geofence generation models to generate geofences. For example, the machine-learned geofence generation models can be configured to receive and process vehicle tracking data to generate geofences for the transportation locations. For example, the machine-learned geofence generation models can directly produce the geofences or can produce clusters of data entries that correspond to transportation locations and which can be used to generate the geofences.

Geofences can be periodically added and/or deprecated over time based on an analysis (e.g., as described herein) of rolling windows of vehicle tracking data (e.g., geofences can be added, updated, and/or deprecated each month based on vehicle tracking data received during the past month).

Geofences can be assigned or correlated to certain transportation locations (e.g., Terminal 3, Berth 2) through an automated process and/or via human labeling. In one example, an automated process can compare the centroid of each cluster/geofence to a particular location that is associated (e.g., in a geographic information system, in map data, and/or with user-generated location pins) with particular transportation locations. In another example, an association between a cluster/geofence and a particular transportation location can be inferred by correlating vehicle tracking data with other forms of vehicle data (e.g., itinerary data, late event update data, and/or the like) which may be late, but accurate.

Once the geofences have been generated for the transportation locations, the geofence data (e.g., data descriptive of each geofence's perimeter or area) can be stored (e.g., in the database 107) for later usage. In particular, at 312, the computing system can deploy the generated geofences for use in imputation of shipping milestones.

Figure 5:
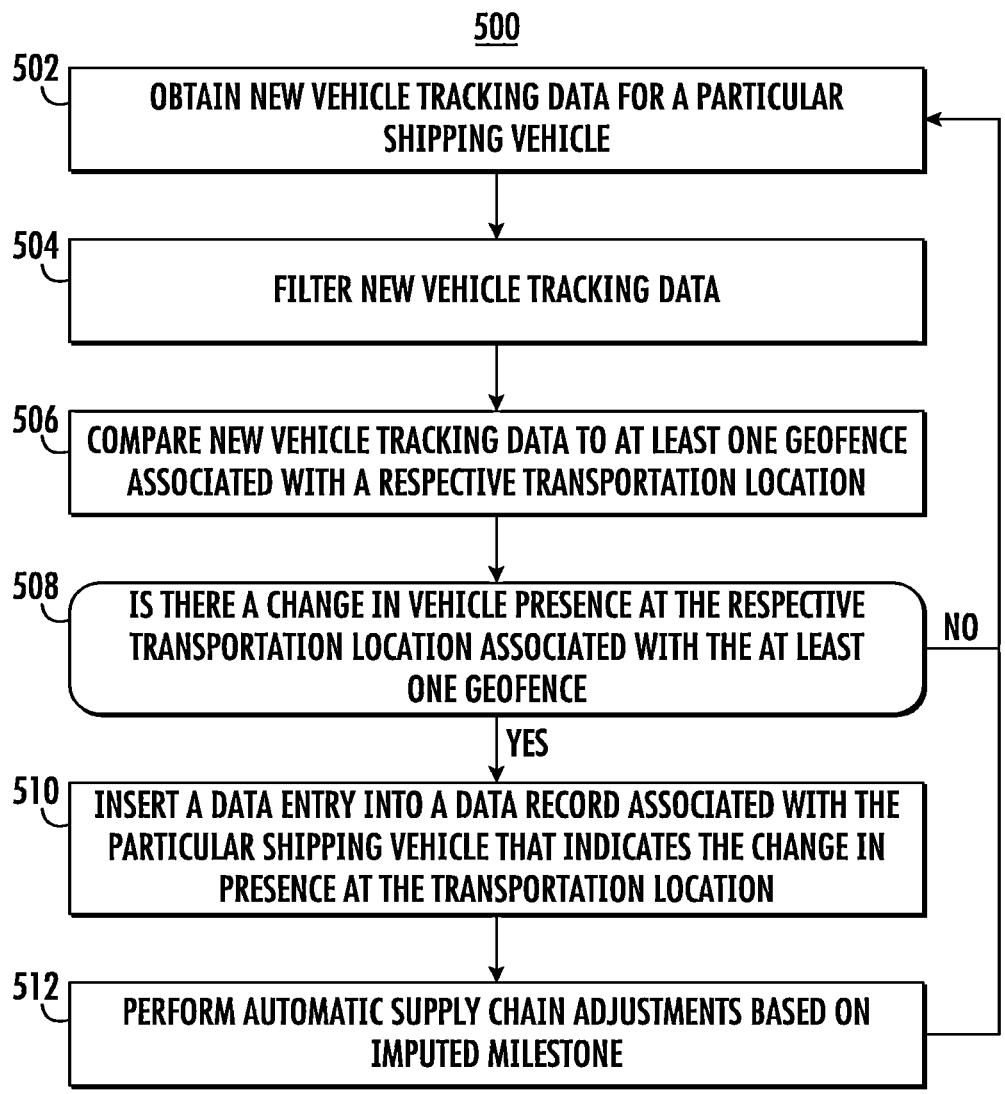
FIG. 5 depicts a flow chart diagram of an example method for applying geofences to impute shipment milestones according to example embodiments of the present disclosure.

FIG. 5 depicts a flow chart diagram of an example method 500 to perform supply chain management according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain new vehicle tracking data for a particular shipping vehicle. For example, the new vehicle tracking data can indicate a current location of the particular shipping vehicle.

At 504, the computing system can filter the new vehicle tracking data. As one example, the computing system can filter out (e.g., using a low pass speed filter) any new vehicle tracking entries that provide a speed that is greater than a threshold. Application of such a tilter can produce filtered new vehicle tracking entries, where the filtered new vehicle tracking entries include only new vehicle tracking entries that describe speeds below the threshold speed. In such fashion, the new vehicle tracking entries can be filtered to identify entries that correspond to instances in which the shipping vehicle is stopped (as indicated by the speed value of low magnitude). A stop may be detected for each of the filtered new entries or for each continuous sequence of filtered new entries.

At 506, the computing system can compare the new vehicle tracking data to at least one geofence associated with at least one transportation location. At 508, the computing system can determine, based on the comparison performed at 506, whether there has been a change in vehicle presence at the respective transportation location associated with the at least one geofence. For example, a change in the vehicle presence at the transportation location can correspond to an arrival of the vehicle at the transportation location (e.g., change from not present to present) or can correspond to departure of the vehicle from the transportation location (e.g., change from present to not present).

As one example, presence of a shipping vehicle at a transportation location can be detected or predicted upon any instance of one of the new vehicle tracking entries associated with the shipping vehicle providing a location that is within the geofence associated with such transportation location. In other implementations, a certain confidence may need to be built in order to detect or predict presence of the vehicle at the transportation location. For example, presence of the vehicle at the transportation location may be detected only when multiple sequential entries (e.g., 3 sequential entries) or a certain number of entries out of a sequence of entries (e.g., 5 out of the last 7 sequential entries) provide locations that are within the corresponding geofence. Likewise, in some implementations, a lack of presence of the vehicle at the transportation location (e.g., in the case that the vehicle has previously been at the transportation location) can be detected only when multiple sequential entries (e.g., 3 sequential entries) or a certain number of entries out of a sequence of entries (e.g., 5 out of the last 7 sequential entries) provide locations that are not within the corresponding geofence.

In some implementations, at 508, the computing system can include and use one or more machine-learned milestone detection models to detect milestones. For example, the machine-learned milestone detection models can be configured to receive and process new vehicle tracking data to produce predictions regarding the occurrence of milestones.

If it is determined at 508 that there has not been a change, then method 500 can return to 502 and again obtain new data. However, if it determined at 508 that there has been a change, then method 500 can proceed to 510.

At 510, the computing system can insert a data entry into a data record associated with the particular shipping vehicle that indicates the change in presence of the shipping vehicle at the transportation location. As one example, the data entry can indicate an arrival of the vehicle at the transportation location. As another example, the data entry can indicate a departure of the vehicle from the transportation location.

At 512, the computing system can perform automatic supply chain adjustments based on the updated milestones data. For example, at 512, the computing system can perform automatic supply chain adjustments based on the updated milestones. As examples, the computing system can proactively detect, share and resolve shipment issues. For example, the computing system can generate and transmit automatic alerts to the shipper, carrier, and/or customers and/or partners of the shipper that indicate the updated itinerary. The alerts can provide the updated information and, in some implementations, include adjustments to previously provided orders, requests, invoices, and/or the like. Thus, for example, if it is detected based on the imputed milestones that the item of cargo will now be two days earlier, the delivery of materials or products planned to be combined (e.g., in a manufacturing sense) with such item of cargo can be requested to be supplied by other providers two days earlier as well, thereby enabling the most efficient combination of the item of cargo with such materials or products. Likewise, the labor associated with the combination can be automatically scheduled for two days earlier than previously requested. As another example, an invoice can be automatically sent based on the updated itinerary. Thus, in some implementations, logical connections and/or dependencies between multiple different shipments, orders, labor requests, facilities management plans, and/or the like can be established (e.g., by the shipper and/or a customer of the shipper) and these logical connections can be used to perform automatic supply chain adjustments.

In some implementations, at block 512, the computing system can use one or more machine-learned supply chain adjustment models to generate adjustments to one or more facets of a supply chain that are interrelated to the item of cargo based on the updated milestones. For example, the machine-learned supply chain adjustment models can be configured to receive and process data that describes the original event data and the updated event data to produce automatic supply chain adjustments (e.g., modification of requested delivery dates or labor fulfillment dates).

Thus, aspects of the present disclosure provide a solution for incomplete or inaccurate event data for shipments (e.g., containers transported via an ocean-going container ship). In particular, through prediction of milestones or other events, aspects of the present disclosure enable predictive visibility into shipment status, thereby enabling proactive supply chain management actions which improve supply chain efficiency and the customer experience. For example, a shipper of the item of cargo can access the updated data record (e.g., via a web application or platform supplied by the supply chain management computing system) to receive the updated information regarding the item of cargo and/or the supply chain management computing system can provide notifications, alerts, and/or the like to the shipper. This can enable the shipper to better optimize the supply chain to reflect or account the updated itinerary of the item of cargo.

Example Model Configurations

FIG. 6 depicts an example processing workflow for training a machine-learned model 110 according to example embodiments of the present disclosure. In particular, the illustrated training scheme trains the model 110 based on a set of training data 162.

The training data 162 can include, for example, historical data that indicates the historical outcomes of various previous shipments (e.g., which may take the form of shipping logs). In some implementations, the training data 162 can include a plurality of training example pairs, where each training example pair provides: (602) a set of data (e.g., incorrect and/or incomplete data); and (604) a ground truth label associated with such set of data, where the ground truth label provides a "correct" prediction for the set of data. For example, the training example can include: (602) itinerary and/or vehicle event data that was collected prior or during a shipment; and (604) a ground truth label derived from historical data that indicates what the actual itinerary or events were for such shipment.

As one example, a training example pair can include: (602) vehicle tracking entries; and (604) ground truth labels for whether each vehicle tracking entry corresponds to a stopped vehicle or a vehicle in transit. As another example, a training example pair can include: (602) vehicle tracking entries (e.g., filtered entries); and (604) ground truth labels for whether each vehicle tracking entry corresponds to a vehicle at a transportation location or a vehicle at a waiting area. As another example, a training example pair can include: (602) vehicle tracking entries (e.g., filtered entries); and (604) ground truth clusters that correspond to transportation locations at which the vehicles are stationed, docked, parked, etc. As another example, a training example pair can include: (602) vehicle tracking entries (e.g., filtered entries); and (604) ground truth geofences that correspond to transportation locations at which the vehicles are stationed, docked, parked, etc. As another example, a training example pair can include: (602) vehicle tracking entries (e.g., filtered entries); and (604) ground truth labels that correspond to whether each vehicle tracking entry correspond to a newly achieved milestone. As yet another example, a training example pair can include: (602) an original set of itinerary or event data and changes to such itinerary or event data (e.g., addition of milestone events); and (604) additional updates to the itinerary (e.g., predicted new discharge dates, etc.). As another example, a training example pair can include: (602) data that describes an original itinerary or event set and an updated itinerary or event set (e.g., including predicted new arrival or departure events, predicted new discharge dates, etc.); and (604) automatic supply chain adjustments (e.g., modification of requested delivery dates or labor fulfillment dates) that should be performed based on change from the original itinerary to the updated itinerary.

Based on the set of data 602, the machine-learned model 110 can produce a model prediction 606. As examples, the model prediction 606 can include a prediction of the ground truth label 604. Thus, as one example, if the ground truth label 604 provides one or more actual milestone location(s) and/or date(s), then the model prediction 606 can correspond to predicted milestone location(s) and/or date(s).

A loss function 608 can evaluate a difference between the model prediction 606 and the ground truth label 604. For example, a loss value provided by the loss function 608 can be positively correlated with the magnitude of the difference.

The model 110 can be trained based on the loss function 608. As an example, one example training technique is backwards propagation of errors ("backpropagation"). For example, the loss function 608 can be backpropagated through the model 110 to update one or more parameters of the model 110 (e.g., based on a gradient of the loss function 608). Various loss functions can be used such as mean squared error, likelihood loss, cross entropy loss, hinge loss, and/or various other loss functions. Gradient descent techniques can be used to iteratively update the parameters over a number of training iterations.

FIG. 7 depicts an example processing workflow for employing the machine-learned model 110 following training according to example embodiments of the present disclosure.

As illustrated in FIG. 7, the machine-learned model 110 can be configured to receive and process a set of data 702. The set of data 702 can be of any of the different types of data discussed with respect to 602 of FIG. 6, or other forms of data. As one example, the set of data 702 can include itinerary data and/or vehicle event data.

In response to the set of data 702, the machine-learned model 110 can produce a model prediction 706. The model prediction 706 can be of any of the different types of data discussed with respect to 604 or 606 of FIG. 6, or other forms of data. As one example, the model prediction 706 can include one or more predicted milestone location(s) and/or date(s).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed:

1. A computer-implemented method for performing automatic supply chain adjustments in instances of incomplete or inaccurate event data for shipments, the computer-implemented method comprising:
    defining, by at least one processor, a set of geofences associated with a set of transportation locations by performing a set of clustering techniques on historical vehicle tracking data;
    training, by the at least one processor using a set of training data associated with a set of shipping vehicles, a milestone detection machine learning model, the set of training data comprising vehicle tracking data labeled with a set of milestone events associated with the set of shipping vehicles;
    obtaining, by the at least one processor, a set of vehicle tracking data associated with a shipping vehicle, wherein the set of vehicle tracking data is missing a shipment milestone associated with the shipping vehicle;
    analyzing, by the at least one processor using the milestone detection machine learning model, the set of vehicle tracking data to determine, for the shipment milestone that is missing from the set of vehicle tracking data, that there has been a change in presence of the shipping vehicle at a transportation location, of the set of transportation locations, associated with a geofence of the set of geofences;
    in response to determining that there has been the change in presence of the shipping vehicle at the transportation location associated with the geofence, processing, by a supply chain adjustment machine learning model, data that describes (i) the set of vehicle tracking data and (ii) the change in presence of the shipping vehicle that was determined, to produce at least one automatic supply chain adjustment; and
    inserting a data entry into a data record associated with the shipping vehicle that indicates the change in presence of the shipping vehicle at the transportation location associated with the geofence, to reflect the shipment milestone that is missing, and to enable predictive visibility into shipment status and proactive supply chain management action.

2. The computer-implemented method of claim 1, further comprising:
    generating, by the at least one processor, an alert that indicates the change in presence of the shipping vehicle at the transportation location associated with the geofence; and
    transmitting, by the at least one processor, the alert to an entity associated with the shipping vehicle.

3. The computer-implemented method of claim 1, wherein processing the data to produce the at least one automatic supply chain adjustment comprises:
    processing, by the supply chain adjustment machine learning model, the data that describes (i) the set of vehicle tracking data and (ii) the change in presence of the shipping vehicle that was determined, to modify a requested delivery date.

4. The computer-implemented method of claim 1, wherein processing the data to produce the at least one automatic supply chain adjustment comprises:
    processing, by the supply chain adjustment machine learning model, the data that describes (i) the set of vehicle tracking data and (ii) the change in presence of the shipping vehicle that was determined, to modify a labor fulfillment date.

5. The computer-implemented method of claim 1, wherein analyzing the set of vehicle tracking data comprises:
    analyzing, by the at least one processor using the milestone detection machine learning model, the set of vehicle tracking data to determine that either (i) the shipping vehicle has arrived at the transportation location associated with the geofence, or (ii) the shipping vehicle has departed the transportation location associated with the geofence.

6. The computer-implemented method of claim 1, further comprising:
    filtering, by the at least one processor, the set of vehicle tracking data to produce a set of filtered vehicle tracking data indicating a set of instances in which the shipping vehicle is stopped.

7. A shipping management computing system for performing automatic supply chain adjustments in instances of incomplete or inaccurate event data for shipments, comprising:
    a memory storing (i) a milestone detection machine learning model, (ii) a supply chain adjustment machine learning model, and (iii) a set of computer executable instructions; and
    at least one processor coupled to the memory and configured to execute the set of computer executable instructions to cause the at least one processor to:
        define a set of geofences associated with a set of transportation locations by performing a set of clustering techniques on historical vehicle tracking data,
        train, using a set of training data associated with a set of shipping vehicles, the milestone detection machine learning model, the set of training data comprising vehicle tracking data labeled with a set of milestone events associated with the set of shipping vehicles, obtain a set of vehicle tracking data associated with a shipping vehicle, wherein the set of vehicle tracking data is missing a shipment milestone associated with the shipping vehicle, analyze, using the milestone detection machine learning model, the set of vehicle tracking data to determine, for the shipment milestone that is missing from the set of vehicle tracking data, that there has been a change in presence of the shipping vehicle at a transportation location, of the set of transportation locations, associated with a geofence of the set of geofences, in response to determining that there has been the change in presence of the shipping vehicle at the transportation location associated with the geofence, process, by a supply chain adjustment machine learning model, data that describes (i) the set of vehicle tracking data and (ii) the change in presence of the shipping vehicle that was determined, to produce at least one automatic supply chain adjustment, and insert a data entry into a data record associated with the shipping vehicle that indicates the change in presence of the shipping vehicle at the transportation location associated with the geofence, to reflect the shipment milestone that is missing, and to enable predictive visibility into shipment status and proactive supply chain management action.

8. The shipping management computing system of claim 7, wherein the at least one processor is configured to execute the set of computer executable instructions to further cause the at least one processor to:

generate an alert that indicates the change in presence of the shipping vehicle at the transportation location associated with the geofence, and transmit the alert to an entity associated with the shipping vehicle.

9. The shipping management computing system of claim 7, wherein to process the data to produce the at least one automatic supply chain adjustment, the at least one processor is configured to:

process, by the supply chain adjustment machine learning model, the data that describes (i) the set of vehicle tracking data and (ii) the change in presence of the shipping vehicle that was determined, to modify a requested delivery date.

10. The shipping management computing system of claim 7, wherein to process the data to produce the at least one automatic supply chain adjustment, the at least one processor is configured to:

process, by the supply chain adjustment machine learning model, the data that describes (i) the set of vehicle tracking data and (ii) the change in presence of the shipping vehicle that was determined, to modify a labor fulfillment date.

11. The shipping management computing system of claim 7, wherein to analyze the set of vehicle tracking data, the at least one processor is configured to:

analyze, using the milestone detection machine learning model, the set of vehicle tracking data to determine that either (i) the shipping vehicle has arrived at the transportation location associated with the geofence, or (ii) the shipping vehicle has departed the transportation location associated with the geofence.

12. The shipping management computing system of claim 7, wherein the at least one processor is configured to execute the set of computer executable instructions to further cause the at least one processor to:

filter the set of vehicle tracking data to produce a set of filtered vehicle tracking data indicating a set of instances in which the shipping vehicle is stopped.

13. A computer program product for performing automatic supply chain adjustments in instances of incomplete or inaccurate event data for shipments, the computer program product comprising a non-transitory computer readable medium storing a set of computer instructions executable by at least one processor to:

define a set of geofences associated with a set of transportation locations by performing a set of clustering techniques on historical vehicle tracking data;

train, using a set of training data associated with a set of shipping vehicles, a milestone detection machine learning model, the set of training data comprising vehicle tracking data labeled with a set of milestone events associated with the set of shipping vehicles;

obtain a set of vehicle tracking data associated with a shipping vehicle, wherein the set of vehicle tracking data is missing a shipment milestone associated with the shipping vehicle;

analyze, using the milestone detection machine learning model, the set of vehicle tracking data to determine, for the shipment milestone that is missing from the set of vehicle tracking data, that there has been a change in presence of the shipping vehicle at a transportation location, of the set of transportation locations, associated with a geofence of the set of geofences;

in response to determining that there has been the change in presence of the shipping vehicle at the transportation location associated with the geofence, process, by a supply chain adjustment machine learning model, data that describes (i) the set of vehicle tracking data and (ii) the change in presence of the shipping vehicle that was determined, to produce at least one automatic supply chain adjustment; and insert a data entry into a data record associated with the shipping vehicle that indicates the change in presence of the shipping vehicle at the transportation location associated with the geofence, to reflect the shipment milestone that is missing, and to enable predictive visibility into shipment status and proactive supply chain management action.

14. The computer program product of claim 13, wherein the set of computer instructions are executable by the at least one processor further to:

generate an alert that indicates the change in presence of the shipping vehicle at the transportation location associated with the geofence; and transmit the alert to an entity associated with the shipping vehicle.

15. The computer program product of claim 13, wherein to process the data to produce the at least one automatic supply chain adjustment, the at least one processor executes the set of computer instructions to:

process, by the supply chain adjustment machine learning model, the data that describes (i) the set of vehicle tracking data and (ii) the change in presence of the shipping vehicle that was determined, to modify a requested delivery date.

16. The computer program product of claim 13, wherein to process the data to produce the at least one automatic supply chain adjustment, the at least one processor executes the set of computer instructions to:
  process, by the supply chain adjustment machine learning model, the data that describes (i) the set of vehicle tracking data and (ii) the change in presence of the shipping vehicle that was determined, to modify a labor fulfillment date.

17. The computer program product of claim 13, wherein to analyze the set of vehicle tracking data, the at least one processor executes the set of computer instructions to:
  analyze, using the milestone detection machine learning model, the set of vehicle tracking data to determine that either (i) the shipping vehicle has arrived at the transportation location associated with the geofence, or (ii) the shipping vehicle has departed the transportation location associated with the geofence.

* * * * *